United States Patent [19]
Allen et al.

[11] Patent Number: 5,903,409
[45] Date of Patent: May 11, 1999

[54] METHOD AND MEANS FOR MAINTAINING DATA INTEGRITY IN DISK DRIVES RESULTING FROM SHOCK-INDUCED CONTACT BETWEEN RECORDING AND ACCESS COMPONENTS DURING NONOPERATIONAL PERIODS

[75] Inventors: Donald Giles Allen, Morgan Hill; Robert A. Holleran, Monte Sereno; Kirk Barrows Price, San Jose, all of Calif.

[73] Assignee: International Business Machines Corporation, Armonk, N.Y.

[21] Appl. No.: 08/785,454

[22] Filed: Jan. 17, 1997

[51] Int. Cl.[6] .................................................... G11B 5/54
[52] U.S. Cl. ........................................ 360/75; 360/105
[58] Field of Search .................. 360/75, 105; 369/44.27, 369/56

[56] References Cited

U.S. PATENT DOCUMENTS

| | | | |
|---|---|---|---|
| 5,012,371 | 4/1991 | Pollard et al. | 360/105 |
| 5,422,770 | 6/1995 | Alt | 360/105 |
| 5,570,249 | 10/1996 | Aoyagi et al. | 360/106 |
| 5,587,855 | 12/1996 | Kim | 360/97.02 |
| 5,608,592 | 3/1997 | Mizoshita et al. | 360/105 |
| 5,748,421 | 5/1998 | Taki et al. | 360/135 |
| 5,754,371 | 5/1998 | Meyer et al. | 360/105 |

Primary Examiner—Aristotelis M. Psitos
Attorney, Agent, or Firm—R. Bruce Brodie

[57] ABSTRACT

By matching raised hard contact areas on predetermined locations of the actuator/arm/suspension assembly opposite counterpart dedicated tracks or zones, then data track damage can be avoided, otherwise resulting from shock imposed on a disk drive when the disk drive is nonoperational. Such placement permits tradeoffs among the length and power of the error correction code, and the disk area reserved to dedicated tracks or zones.

9 Claims, 5 Drawing Sheets

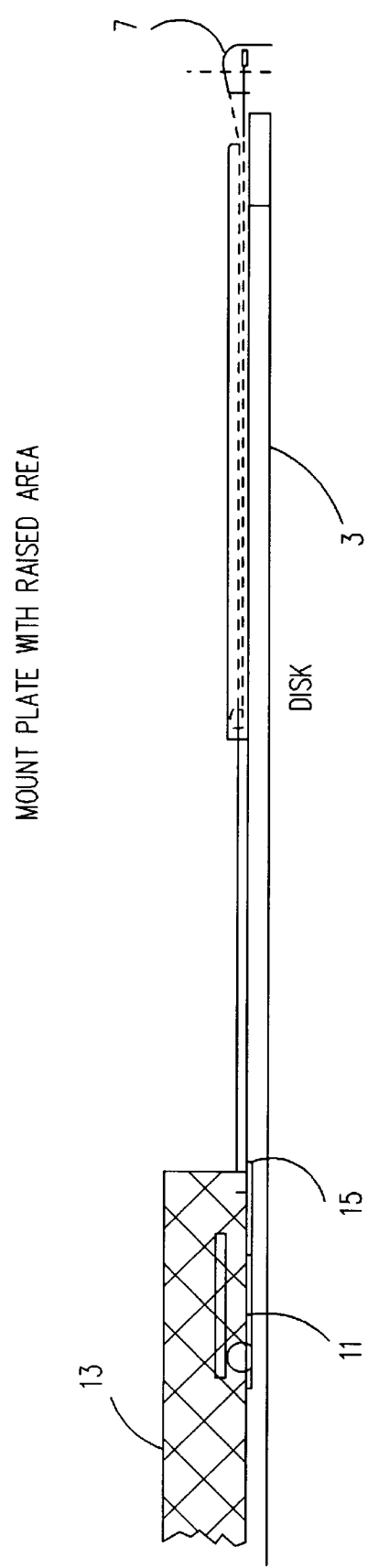

METHOD AND MEANS FOR MAINTAINING DATA INTEGRITY IN DISK DRIVES RESULTING FROM SHOCK-INDUCED CONTACT BETWEEN RECORDING AND ACCESS COMPONENTS DURING NONOPERATIONAL PERIODS

FIELD OF THE INVENTION

This invention relates to reducing the occurrence of hard data errors during nonoperational periods to bands inside a disk data zone occasioned by shock-induced contact between a recording medium (disk) and accessing components (head, arm, or suspension) of a tracked cyclic storage device.

DESCRIPTION OF RELATED ART

A direct access storage device (DASD) or disk drive comprises at least one rotating disk covered with a magnetic coating which can store electronic data and an apparatus for reading data from and writing data to that disk. This is implemented by a "spin motor" to rotate the disk or disks; at least one "read/write head" to read and write data to and from the disk or disks; an "actuator" to position the read/write head or heads radially over the disk or disks, either on a linear or rotary basis; and a "data channel" to transfer information between the read/write head or heads and an accessing source.

The actuator has "arms" extending like prongs toward the disk or disks. Attached to these arms is one end of one or more "load beams" or "suspensions". The latter are thin pieces of metal extending further toward the disk or disks. The other end of each load beam or suspension holds the read/write head assembly above the disk. A wire or wires for the transmission of data to and from the read/write head assembly runs along each suspension or load beam.

In some DASDs, data can be stored on both sides of each disk. The disk or disks are arranged horizontally over the spin motor. In multiple disk units, the disks are parallel to one another with spaces between them. Each disk surface is serviced by a read/write head assembly positioned over that side of the disk by its own actuator arm/load beam assembly. Data is organized on the disks in concentric circles called "tracks", which are divided into "sectors".

The actuator arm/load beam suspension combination moves each read/write head assembly radially or by following an arcuate path across the disk at very high speed to the particular track or tracks to be accessed. In the drives, the actuator arms are either fixed to or integral with the actuator so the arms and their attached load beam suspensions move all the read/write assemblies simultaneously and parallel to one another as the actuator moves. As part of changing a DASD from an operational to a nonoperational state, the head, arms, and suspensions are "parked" over the disks such that the heads are opposite a track or zone.

Alt, U.S. Pat. No. 5,453,889, "Disk Drive with Disk Restraint for Protection Against Non-operational Shocks", issued Sep. 26, 1995; and Alt, U.S. Pat. No. 5,422,770, "Shock Bumper for a Head/Disk Suspension", issued Jun. 5, 1995, pointed out that vibrations and shock capable of damaging a disk drive can occur when the disk drive is not operating, such as during storage or transport of the drive. Indeed, these references state the shock impact in a direction normal to the disk results in collision between the head, suspension, or arm and counterpart areas on the disk. Where the impact disk areas include portions of data tracks, then hard data errors or erasures may occur.

In the prior art, various forms of elastomeric grommets and screws or isolators having studs attached to their ends were used to dampen or absorb the effect of nonoperationally occurring shocks. This resulted in added assembly time in manufacture, and weight and space in the context of a relatively small component DASD in a laptop or portable computer.

Alt's solution in the '889 patent is to restrict the arm, suspension, and head assembly to a nondata region over the outer periphery of the disk. A retaining structure having portions extending into the stacking space between the disks but outside the disk data zone secures a predetermined clearance between the assembly and the disks. Thus, disk vertical motion is restricted and a portion of the disk deformation energy induced from the shock force is absorbed by the retaining structure. Alt's solution in the '770 patent is to attach an elastomeric "shock bumper" to each suspension, preventing direct contact between any part of the assembly and the disk, especially a data region.

Connolly, U.S. Pat. No. 4,939,611, "Vertical Displacement Limit Stop in a Disk Drive for Preventing Disk Surface Damage", issued Jul. 3, 1990, shows another barrier energy absorption approach to minimizing the effects to nonoperating disk drives responsive to shocks, especially head-to-disk collision. Connolly combines flexure mounting plates and flexure limit stop members. The latter are used to limit the vertical movement between the outer peripheral surface of each disk and the surface of an adjacent limit stop member. This obviates any contact with the data zone (tracks) of the disk.

Other energy-damping configurations may be found in the IBM Technical Disclosure Bulletin, Vol. 38, No. 6, June 1995, at pages 433–437.

SUMMARY OF THE INVENTION

It is accordingly an object of this invention to devise a method and means for maintaining the integrity of data recorded on a DASD subjected to impact shock even when nonoperational, such as when the DASD is being transported.

It is a related object that such method and means constrain any contact between the movable DASD components, such as head/suspension/arm assembly, and the disk to a predetermined number and location of points.

It is yet another object that such method and means increase the robustness of a DASD by raising the shock threshold level at which a hard data error would occur.

The foregoing objects are satisfied by an embodiment in which a plurality of hard contact raised areas are embedded in the suspension or arm portion of each accessing assembly. The raised areas are located opposite a track or zone or portion thereof defined over a cylinder of tracks. The track or zone can selectively be either data free, contain noncritical data, or contain data covered by an error correction code (ECC) of power sufficient to reconstruct it. Furthermore, the locations of the raised areas are selected either empirically by subjecting a DASD with a given geometry to shock impact, or by a computational emulation. This will ensure that all points of contact between each assembly and disk are identified a' priori.

Restated, hard data errors due to shock impacting of accessing assemblies against disks of a nonoperating disk drive are avoided by (1) placing raised areas on the contact points of each assembly, and (2) rendering each contacted track or zone in the associated cylinder to be either data free, contain noncritical data, or be ECC reconstructible. Also, where two or more raised areas are embedded on a suspension, arm, or mount plate, then contact caused by the sympathetic torsion or wobble of the assembly can be reduced or eliminated.

In this specification, the term "dedicated track or zone" will be used to mean either a data-free track, a track containing noncritical data, or a track whose data is covered by an ECC powerful enough to reconstruct it. Reed-Solomon is a well-known class of such ECC.

Advantageously, the invention permits a design tradeoff between the degree of shock resistance, disk area reserved to dedicated tracks or zones, and the size and power of the code used to correct disk data errors and erasures. Also, while laptops and notebook computers containing fixed disk drives are the most shock prone because of their very portability, this invention permits the continued use of disks having aluminum substrates, notwithstanding the fact that disks utilizing glass substrates are more damage resistant since it raises the shock threshold level at which a hard data error occurs.

BRIEF DESCRIPTION OF THE DRAWING

FIG. 5 depicts a side elevation view of a raised head on a mount plate.

DESCRIPTION OF THE PREFERRED EMBODIMENT

Figure 1:
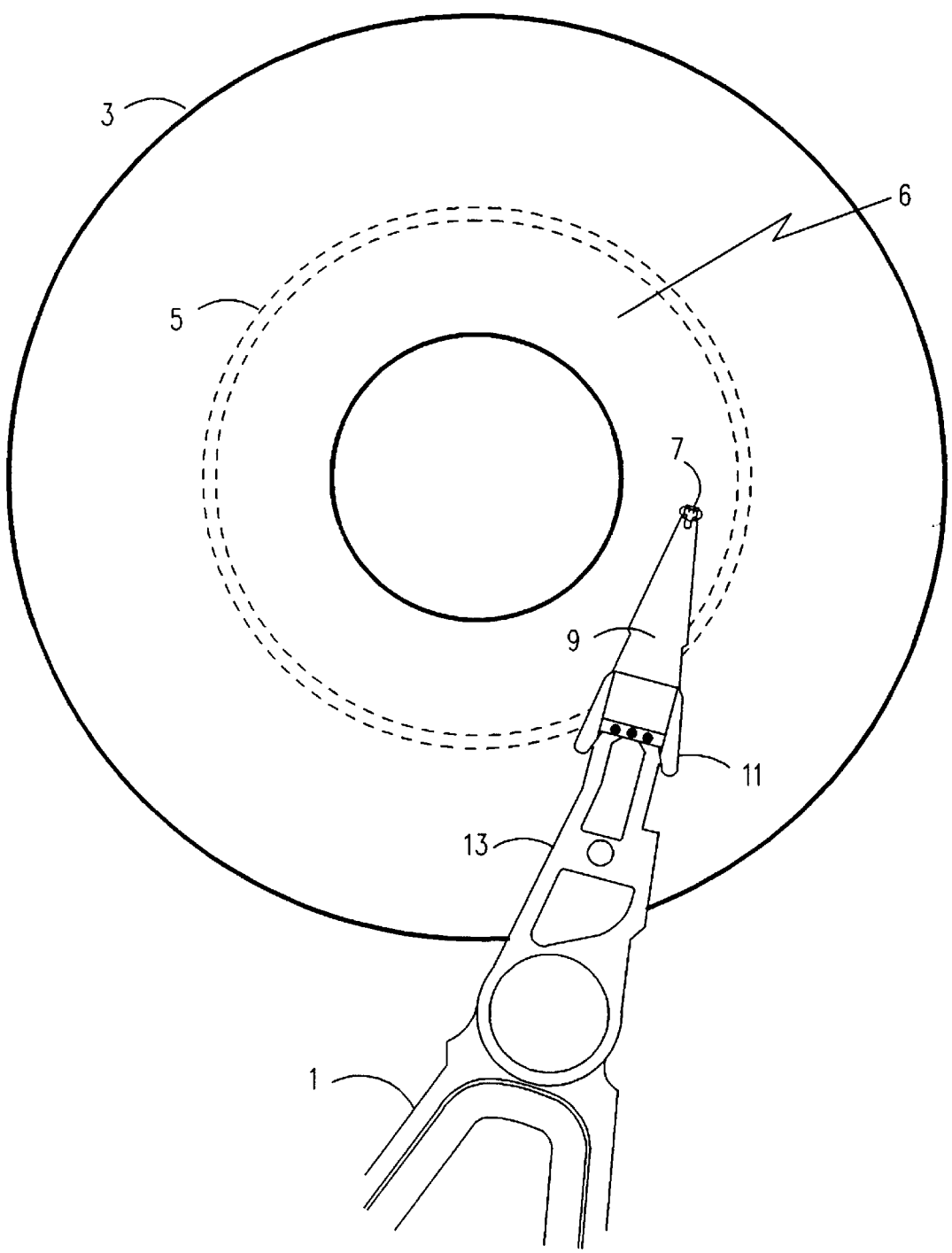
FIG. 1 shows a plan view of a head suspension assembly and a disk with a predetermined dedicated track or zone.

Referring now to FIG. 1, there is shown a plan view of a head suspension assembly 1and a disk 3 with a predetermined dedicated track or zone 5. The assembly 1 includes an arm 13 coupling a spindle motor (not shown). A read/write head 7 tips the narrow end of a flexible, triangularly-shaped suspension 9. The wide end of the suspension is secured to arm 13 by way of a rigid mount plate 11. The assembly 1 is further depicted in the "parked" position 6 on the disk 3. Parenthetically, the parked position 6 is a default or rest position in which the assemblies counterpart to disks mounted on the same spindle are placed when the DASD motor is turned off or shut down.

When a shock is applied perpendicular to the plane of the disk 3, it is evident that each assembly 1 will bounce and or impact with respect to its disk surface in a transient pattern with deflected shape determined as a function of the mechanical geometry and the time-varying magnitude of the shock impulse. The very flexibility of the assembly ensures several points of resonant impact responsive to the application of a broad band shock impulse or step function. That is, a Fourier analysis of a shock impulse indicates force magnitudes spread over a broad range of frequencies. Hence, the likelihood of the assemblies and disk resonating to one or more components within the impulse function is high. In this regard, the disks resonate in a upward cupping shape.

Figure 2:
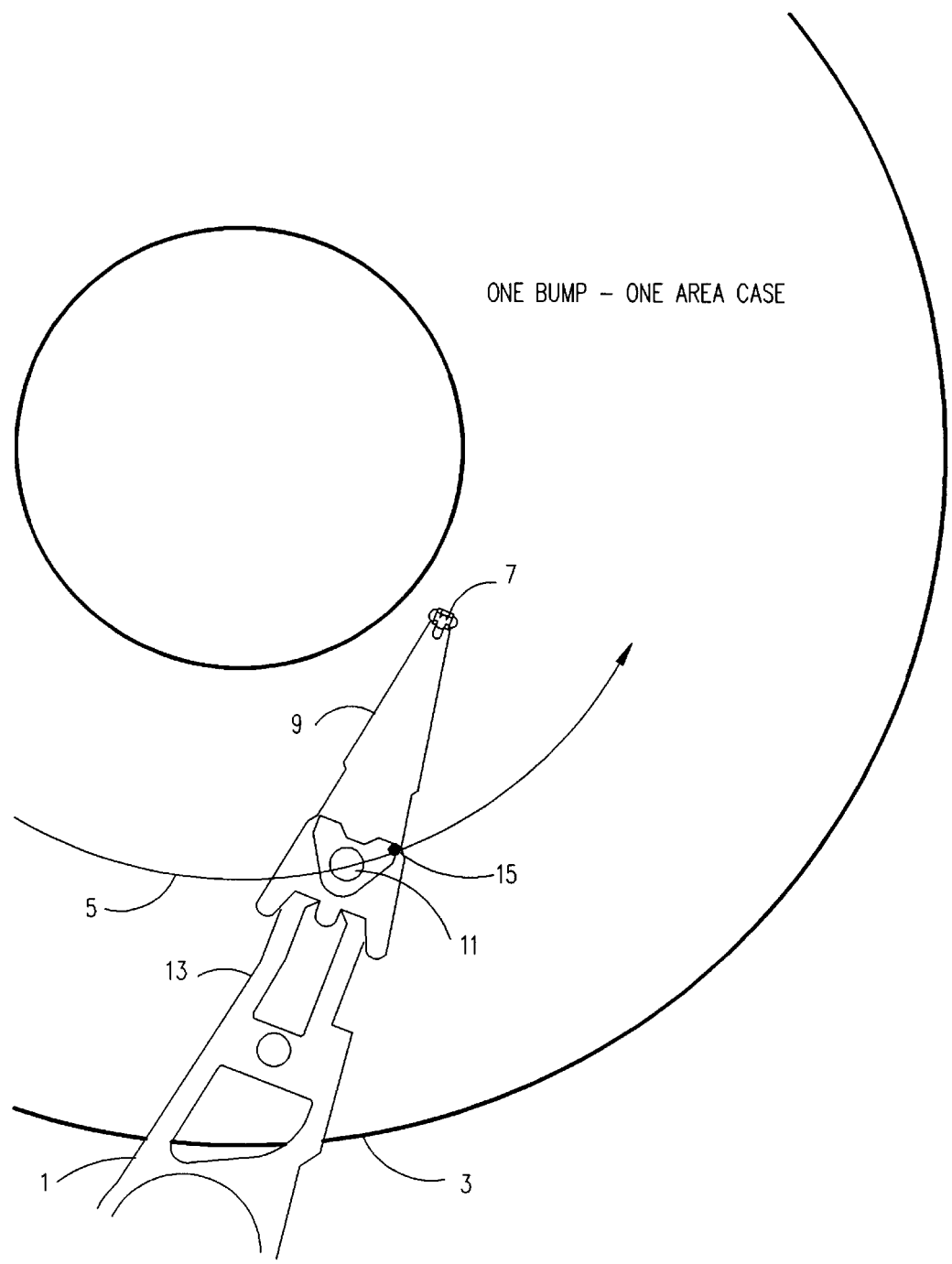
FIG. 2 illustrates the placement of one raised area on the mount plate and one counterpart dedicated track or zone.

Referring now to FIG. 2, there is illustrated the placement of one raised area on the mount plate and one counterpart dedicated track or zone. In this regard, a raised area 15 is fashioned in the leading edge of the mount plate 11. In this embodiment, it is assumed that disk 3 rotates in a clockwise direction. It should be noted that raised area 15 is tangent to a track 5, which track or a portion thereof is reserved as a dedicated track or zone. Given that there are several disks coaxially fixed to the same spindle, then each assembly would have the raised area embossed in the same leading edge location and would be opposite the same track. Illustratively, the raised area 15 formed in the mount plate 11 would be approximately 0.050 mm high and would contact the disk 3 at a data-free track defined at a nominal disk radius of 28.5 mm. A reserved band of 0.05 mm on either side of the nominal radius is allowed for tolerances.

The problem arises that if the DASD shown in FIG. 2 is subject to shock, it is entirely feasible that arm 13 or suspension 9 would twist or wobble, thus contacting disk tracks containing data. While reserving dedicated tracks or zone opposite the raised areas avoids data damage, it reduces the space available for data storage. One answer is to empirically determine the contact points. This can be attained by mechanically delivering a range of shock impacts to the DASD in a plane normal to the disks and then note the impact points. Alternatively, such effects can be emulated on a head-disk-arm (HDA) mathematical model using finite element analysis of the same or similar geometry. The model would also take into account base plate and spindle, in addition to the assembly. Raised areas can then be placed on each assembly opposite the disk and counterpart dedicated track or zone. The function of the raised areas is to ensure that contact occurs only at those locations.

Restated, if only a single raised area 15 were used as shown in FIG. 2, the assembly 1 under sufficient shock levels could twist so that another part of the assembly such as the arm 13, suspension 9, or head 7 would contact the disk 3. Now, in order to ensure that any second point of contact would be well defined, then one or more raised areas can be added to the mount plate 11 or elsewhere on the assembly. These are illustrated in FIGS. 3 and 4.

Figure 3:
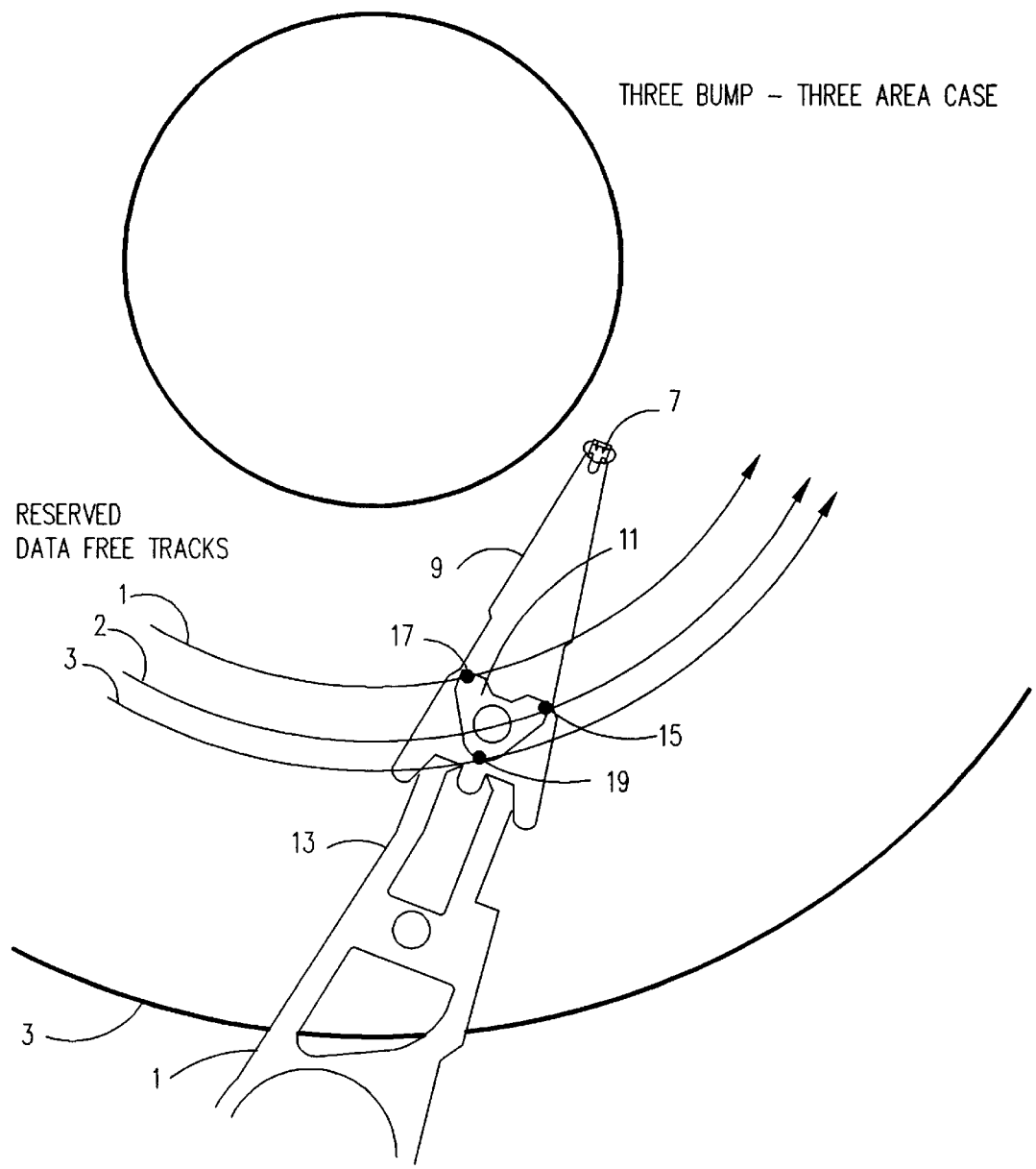
FIG. 3 sets out three raised areas on the mount plane opposite three dedicated tracks or zones effectuating a wobble-free suspension.

Referring now to FIG. 3, there are shown three raised areas 15, 17, 19 on the mount plate 11 opposite three dedicated tracks or zone in order to control the wobble contact. However, a refined assessment can take advantage of the fact that only two contacts are necessary to define a common circumferential track.

Figure 4:
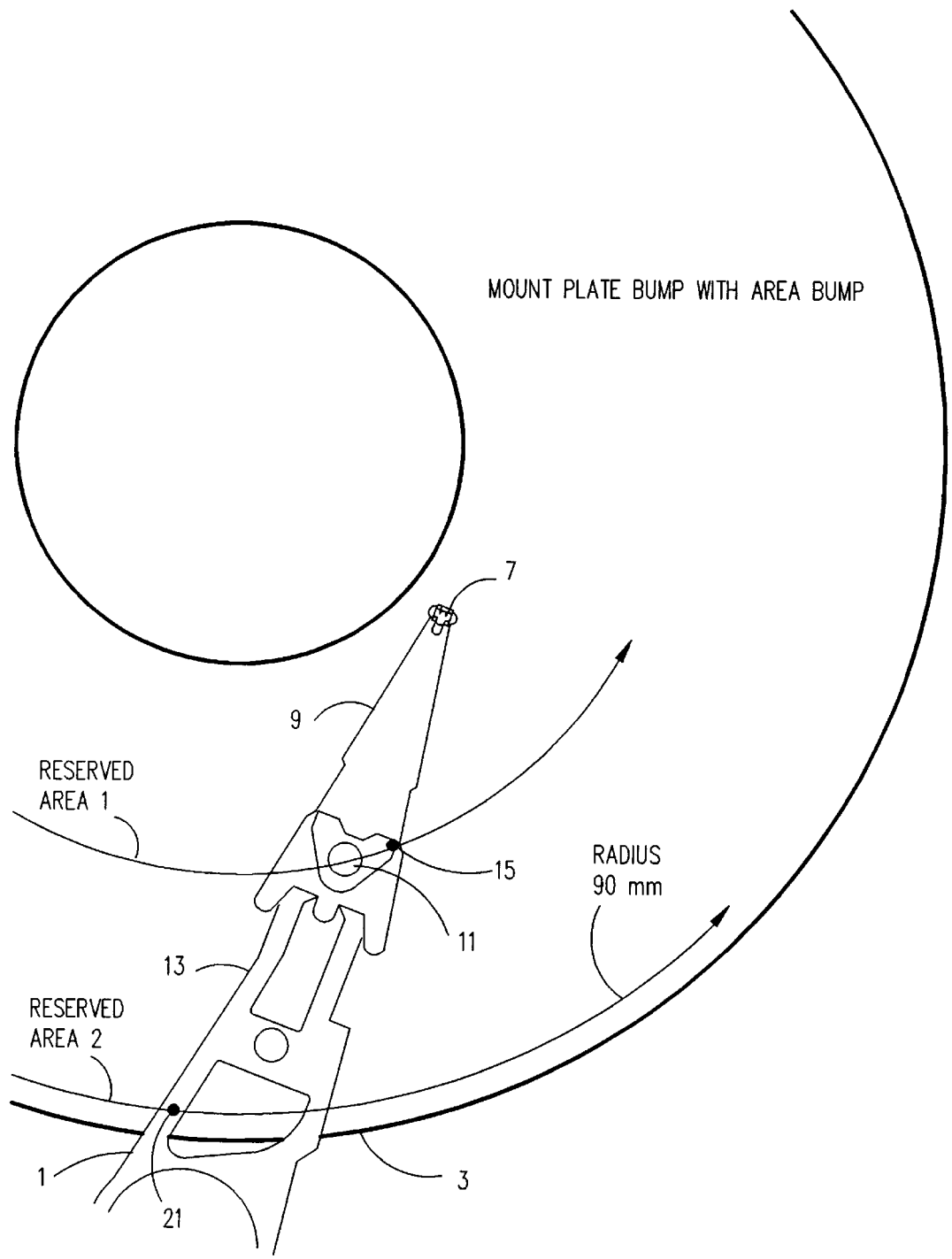
FIG. 4 depicts a raised area on the mount plate and another raised area on the arm opposite two dedicated tracks or zones.

Referring now to FIG. 4, there is shown a path defined by the raised areas 15 and 21. These points are contained within the geometry of the assembly 1. Consequently, only two dedicated tracks or zone need be reserved, rather than the three as shown in the FIG. 3 embodiment.

Referring now to FIG. 5, there is depicted a side elevation view of a raised area 15 on the mount plate 11. Note, the raised area dome extends but 0.05 mm closer to the plane of the disk 3. Also, the mount plate 11 is typically secured to both arm 13 and suspension 9 by a welding or swaged joints. This view emphasizes the shock-induced deflection and multiple contact point possibilities occasioned by a flexible and movable assembly 1 on one hand and the disk 3 on the other.

Extensions

The principles of this invention can readily be extended to tracked storage devices other than those coated with remanent magnetic media. For example, some storage devices read layered optical media such as CD ROMs. CDs record data on addressable, sectored, helical tracks. It would be an evident measure to determine the points of contact of the assembly or its functional and structural equivalent and reserve counterpart dedicated sectors or the like.

These and other extensions of the invention may be made without departing from the spirit and scope thereof as recited in the appended claims.

What is claimed is:

1. A direct access storage device comprising:
   at least one cyclic, multitracked, magnetic recording medium;
   means for rotating the medium;
   transducer means for magnetically reading or recording data; and
   means for positioning said transducer means over selective ones of the tracks of the rotating medium and for parking itself and said transducer in contact relation with a predetermined portion of the medium when the medium is not rotating, said device further comprising:
   at least one dedicated track or zone on said medium; and
   a plurality of raised areas on said positioning means ordinarily spaced apart from said medium and located opposite to the counterpart dedicated track or zone when the medium is not rotating such that the points of contact between the positioning means and the medium being limited to the raised areas and the dedicated track or zone in the event of a nonoperational shock force being imparted normal to the medium;
   said plurality of raised areas being sited on the positioning means to limit any twist or wobble motion of the positioning means under impact of the shock force.

2. The direct access storage device according to claim 1, wherein each of the raised areas exhibits a degree of hardness sufficient to resist deformation to itself in the event that the raised area contacts the medium responsive to a shock force.

3. The direct access storage device according to claim 1, wherein the means for positioning the transducer includes an arm, a triangularly-shaped flexible suspension having narrow and wide ends, the transducer tipping the suspension at its narrow end, and a mounting plate fastening the wide end of the suspension to the arm; and further wherein said plurality of raised areas being sited on the suspension to ensure contact between the suspension and the medium only at the raised areas independent of any twist or wobble motion of said suspension under impact of the shock force.

4. The direct access storage device according to claim 3, wherein the plurality of raised areas being sited on the mounting plate or arm, said plate otherwise imparting stiffness to said suspension and for providing a swaged connection to said arm.

5. A method for maintaining integrity of data recorded on cylinders defined over a plurality of same spindle-mounted, cyclically operable, multitracked magnetic recording disks; tracks on the same defined cylinder being synchronously accessed by counterpart head, arm, and connecting flexible suspension assemblies; said assemblies being positioned over a predetermined portion of the disks when said disks are stationary, comprising the steps of:
   (a) exciting the disks and their counterpart accessing assemblies with shock forces of duration and magnitude to cause contact when said disks are stationary, said excitation being applied orthogonal to the plane of the disks;
   (b) ascertaining the points of contact between each disk and its counterpart assembly;
   (c) reserving tracks on each disk as dedicated tracks or zone whose cycle includes at least one contact point; and
   (d) embedding a plurality of raised areas at the contact points on the assemblies spaced apart from and located opposite to counterpart ones of the dedicated tracks or zones on the stationary disks, the plurality of raised areas being placed so as to limit any twist or wobble associated with the flexible suspension or arm subjected to shock force excitement.

6. The method according to claim 5, wherein the step of shock force exciting includes the step of selecting an excitement function from a set of functions consisting of an impulse function, a step function, and pulses of finite duration.

7. A direct access storage device comprising:
   at least one spindle-mounted, multitracked magnetic recording disk, predetermined ones of said tracks being reserved as dedicated tracks or zones;
   means for rotating the spindle;
   a transducer for magnetically reading or recording data; and
   means for positioning said transducer means over selective ones of the tracks of the rotating disk and including:
   means for parking itself and said transducer in contact relation with a predetermined portion of the medium when the medium is not rotating;
   an arm, a triangularly-shaped flexible suspension having narrow and wide ends, and a mounting plate fastening the wide end of the suspension to the arm, the narrow end of the suspension supporting the transducer; and
   a plurality of raised areas ordinarily spaced apart from said disk and located at predetermined positions on at least the arm, suspension, or the mounting plate and opposite ones of the predetermined one or more dedicated tracks or zones when the disk is not rotating such that the points of contact between the positioning means and the disk being limited to the raised areas and the dedicated tracks or zones in the event of a nonoperational shock force being imparted normal to the disk, the plurality of raised areas being placed so as to limit any twist or wobble associated with the flexible suspension or arm subjected to shock free excitement.

8. The direct access storage device according to claims 1 or 7, wherein each dedicated track or zone is selected from a set of tracks consisting of a data-free track, a track containing noncritical data, and a track whose data is covered by an error correction code (ECC) powerful enough to reconstruct it.

9. A direct access storage device comprising:
   at least one spindle-mounted, optical storage medium having a substantially helical and sector-addressable recording track, predetermined ones of said sectors being reserved as dedicated sectors;
   means for rotating the spindle;
   a transducer for optically reading data; and
   means for positioning said transducer means over selective ones of the sectors of the helical track on the rotating disk and including:
   means for parking itself and said transducer in contact relation with a predetermined portion of the medium when the medium is not rotating;
   movable means for mounting said transducer; and a plurality of raised areas ordinarily spaced apart from said disk and located at predetermined positions on said mounting means and opposite ones of the predetermined one or more dedicated sectors when the disk is not rotating such that the points of contact between the mounting means and the disk being limited to the raised areas and the dedicated sectors on the helical track in the event of a nonoperational shock force being imparted normal to the disk, the plurality of raised areas being placed so as to limit any twist or wobble associated with the mounting means subjected to shock force excitement.

* * * * *